United States Patent
Jacob

(10) Patent No.: US 6,886,608 B2
(45) Date of Patent: May 3, 2005

(54) FILING DEVICE FOR OIL LEVEL REGULATION ON OIL PANS IN ENGINES AND TRANSMISSIONS

(75) Inventor: Michael Jacob, Morsbach (DE)

(73) Assignee: IBS Filtran Kunststoff-/Metallerzeugnisse GmbH (DE)

( * ) Notice: Subject to any disclaimer, the term of this patent is extended or adjusted under 35 U.S.C. 154(b) by 0 days.

(21) Appl. No.: 10/278,890

(22) Filed: Oct. 24, 2002

(65) Prior Publication Data
US 2003/0221746 A1 Dec. 4, 2003

(30) Foreign Application Priority Data
Jun. 3, 2002 (EP) .............................................. 02012187

(51) Int. Cl.⁷ .............................................. F16N 33/00
(52) U.S. Cl. .............................. 141/86; 141/95; 141/98; 141/113; 141/353; 141/356; 184/1.5
(58) Field of Search .............................. 141/65, 86, 95, 141/98, 113, 351, 353, 355, 356; 184/1.5; 73/290 R

(56) References Cited

U.S. PATENT DOCUMENTS

| 3,387,621 A | * | 6/1968 | Schaff .......................... 137/322 |
| 3,662,858 A |   | 5/1972 | Peterson ................. 184/103 R |
| 5,107,808 A | * | 4/1992 | Mahn et al. ............. 123/195 C |
| 5,808,187 A |   | 9/1998 | Gooden et al. ............ 73/118.1 |

FOREIGN PATENT DOCUMENTS

| DE | 4311905 | 10/1994 |
| FR | 2795174 | 12/2000 |

* cited by examiner

*Primary Examiner*—Gregory L. Huson
*Assistant Examiner*—Peter deVore
(74) *Attorney, Agent, or Firm*—Baker & Hostetler LLP

(57) ABSTRACT

The invention relates to a filling device for oil level regulation on oil pans in engines and transmissions, with an opening 1 in the base of the oil pan 2 which is closable with an oil drain screw 10, an oil filling collar 3 being arranged over the opening 1, the oil filling collar 3 projecting into the interior 4 of the oil pan, and a filling pipe 5 as an extension of the oil filling collar 3 being releasably attached to the oil filling collar 3, the free end 6 of the filling pipe 5 representing an overflow opening 7; the invention also relates to an oil pan containing the inventive filling device.

22 Claims, 4 Drawing Sheets

FILING DEVICE FOR OIL LEVEL REGULATION ON OIL PANS IN ENGINES AND TRANSMISSIONS

BACKGROUND OF THE INVENTION

The present invention relates to a filling device for oil level regulation on oil pans in engines and transmissions and to an oil pan containing the inventive filling device.

For certain applications, and particularly for automatic transmissions in motor vehicles and also for oil pans in engines, it is important to precisely set the filling level of the oil concerned in order to ensure the trouble-free operation of the transmission or engine.

The prior art therefore proposes applying a filling hole, for example, to the side of the oil pan or laterally on the transmission or engine, as a result of which the oil level can be determined by the positioning of this filling hole.

If lateral filling openings are to be avoided, the prior art also proposes that the oil is filled from below, i.e. via the oil outlet, which is arranged on the base of the oil pan.

Thus, DE 43 11 905 proposes a filling and control device for a container fillable with a liquid to a defined level, and particularly for an automatic transmission in a motor vehicle, said device having a very complicated arrangement, with an oil drain screw, ball check valve, a length of pipe projecting vertically into the interior of the oil pan, with the top, free end of said pipe serving as the overflow opening, etc.

SUMMARY OF THE INVENTION

The technical object of the present invention is therefore to simplify the design of a filling device for oil level regulation on oil pans in engines and transmissions and nevertheless to ensure the safety of service staff when draining the hot oil and servicing the oil pan.

DETAILED DESCRIPTION OF THE EMBODIMENT

Figure 1:
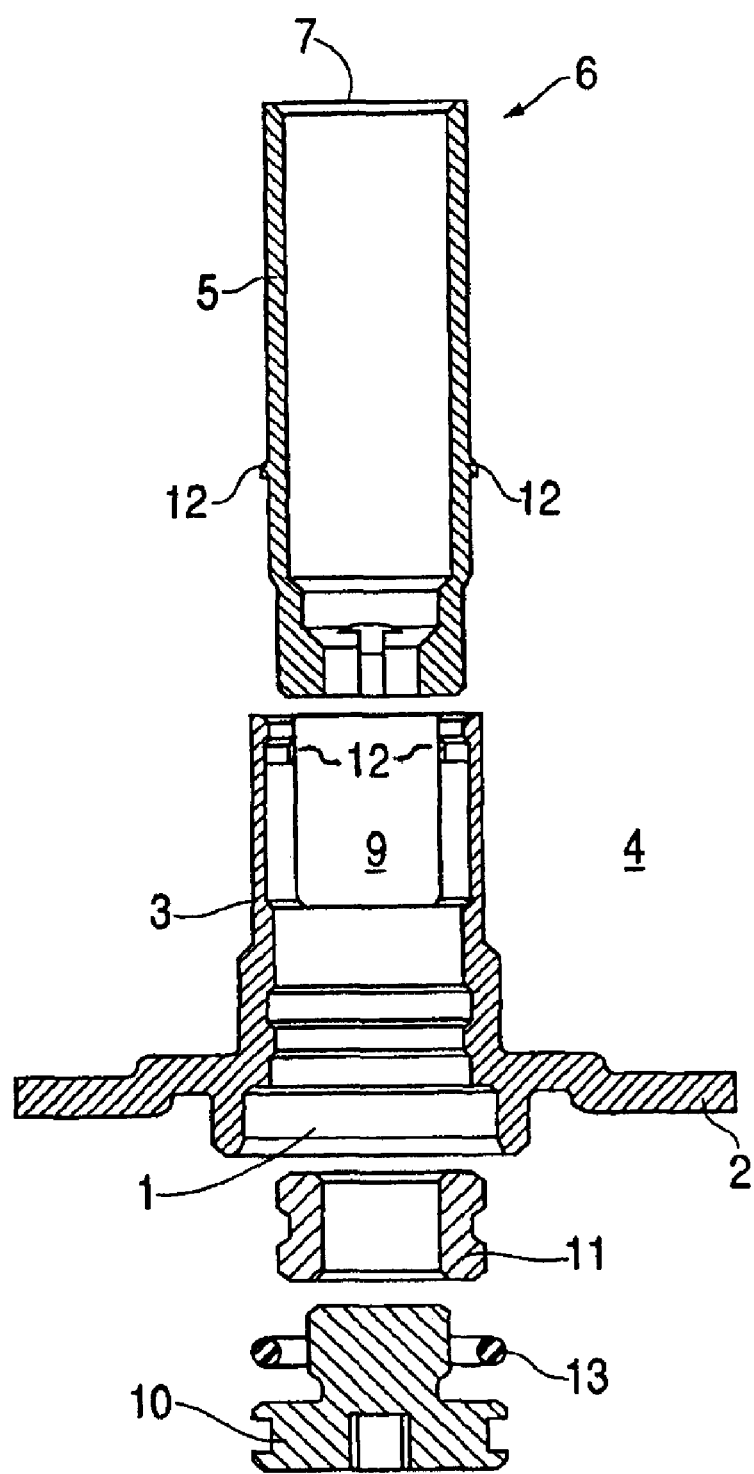
FIG. 1 shows an exploded section view through the filling device for oil level regulation.

This technical object is achieved by a filling device for oil level regulation on oil pans in engines and transmissions, with an opening 1 in the base of the oil pan 2 which is closable with an oil drain screw 10, an oil filling collar 3 being arranged over the opening 1, the oil filling collar 3 projecting into the interior 4 of the oil pan, and a filling pipe 5 as an extension of the oil filling collar 3 being releasably attached to the oil filling collar 3, the free end 6 of the filling pipe 5 representing an overflow opening 7.

In a preferred embodiment the filling pipe 5 and the oil filling collar can be engaged with each other.

The overflow opening 7 of the filling pipe 5 determines the defined level 8 of the oil.

The filling pipe 5, which is attached to the oil filling collar 3, can be firmly positioned by engagement by moulded-on catch hooks 12, which are situated either on the filling pipe 5 or on the oil filling collar 3. In a particularly preferred embodiment the filling pipe 5 and the oil filling collar 3 are sealed in their engaged state in such a way that the oil in the oil pan can only escape via the overflow opening 7. The gap between the filling pipe 5 and the oil filling collar 3 is sealed so tightly due to the fitting tension of the parts that only a few drops of oil can penetrate through. In a preferred embodiment, a rubber seal can be arranged within this gap between the filling pipe 5 and the oil filling collar 3.

In a particularly preferred embodiment the engagement of the filling pipe 5 and the oil filling collar 3 can be released and the filling pipe 5 displaced in relation to the oil filling collar 3 so that in the oil filling collar a breach 9 covered by a wall of the filling pipe becomes open and the oil can flow out of the oil pan via this breach 9 and through the opening 1 in the oil pan base 2.

In another preferred embodiment the filling pipe 5 is arranged within the oil filling collar 3. In an alternative embodiment the filling pipe 5 is arranged outside the oil filling collar with the consequence that the oil filling collar 3 is situated within the filling pipe 5.

In another embodiment the filling pipe 5 can be displaced so that it becomes detached from the oil filling collar 3.

In an alternative embodiment the filling pipe 5 is displaceable only within certain limits in relation to the oil filling collar 3 and can also be fixed in its retracted state, i.e. when the filling tube 5 is displaced towards the interior 4 of the oil pan, and in this state the oil from the oil pan can flow out via the breach 9 in the oil filling collar and further via the opening 1 in the base 2 of the oil pan.

The oil filling collar 3 is preferably arranged so that it projects essentially vertically into the interior 4 of the oil pan. The same applies accordingly to the filling pipe 5.

In another preferred embodiment the opening 1 in the oil pan base 2 is enclosed by a threaded bushing 11 so that an oil drain screw 10 can be screwed from outside into the threaded bushing 11. In another embodiment the oil filling collar 3 is moulded onto the oil pan. This means that the oil filling collar 3 and the oil pan can be designed in a single piece. In an alternative embodiment the oil filling collar 3 can be arranged on the threaded bushing 11. In this case the oil filling collar 3 and the threaded bushing 11 can be designed in a single piece. The filling pipe 5 and/or the oil filling collar 3 are preferably made of plastic.

To fill the oil into the oil pan, the following procedure is adopted: Depending on the embodiment, the filling pipe 5 is pushed either into or over the oil filling collar 3 until it engages. When the oil pan has been fitted in position in the motor vehicle, oil can be filled via a hose, for example, which is inserted through the opening 1 in the base 2 of the oil pan and through the cavity of the oil filling collar 3 and of the filling pipe 5 into the interior 4 of the oil pan. When the oil level reaches the free end 6 of the filling pipe, which serves as an overflow opening 7, the maximum oil level is reached because any additionally filled oil flows back out again via the overflow opening 7. The oil level can be varied, depending on the exact embodiment of the filling device, e.g. depending on the length of the filling pipe 5 and thus depending on the total length of the piping. Once the oil has reached its defined level 8, the hose is withdrawn from the oil pan and the oil drain screw 10 is screwed into the opening 1 in the oil pan base 2, thus closing the oil pan.

If the oil is to be drained from the oil pan, the oil drain screw 10 is unscrewed from the opening 1 in the oil pan base 2. In this case, only that oil flows out that entered the cavity of the filling pipe 5 and of the oil filling collar 3 due to the motion of the motor vehicle or the oil pan. To drain the rest of the oil from the oil pan the filling pipe is pushed upward with a tool so that the engaged connection between the filling pipe 5 and the oil filling collar 3 is released. The oil can now flow through the resultant gap between the filling pipe 5 and the oil filling collar 3 into the cavity and finally out. An opening or breach 9 is preferably provided on the side of the oil filling collar 3. By releasing the filling pipe 5, this breach 9 becomes freely accessible because it is now no longer covered and sealed by the wall of the filling pipe 5. The oil can now flow out of the oil pan via this lateral opening 9 in the oil filling collar 3 into the cavity of the piping and then out via the opening 1 in the oil pan base 2 so that it can be collected.

Depending on the embodiment the filling pipe 5 can be engaged in a further position in its retracted state, i.e. in its open state, or raised to such an extent that it is detached from the oil filling collar 3 and drops into the oil pan. The lower the lateral openings 9 are arranged in the oil filling collar, the less oil remains in the oil pan. When the oil has been drained from the oil pan, the oil pan can be removed, with some oil possibly having remained in the oil pan, and servicing work can continue.

The technical object is also achieved by a filling device for oil level regulation on oil pans in engines and transmissions, with an opening 101 in the base of the oil pan 102 which is closable with an oil drain screw 110, an oil filling collar 103 being arranged over the opening 101, the oil filling collar 103 projecting into the interior 104 of the oil pan and the free end 106 of the oil filling collar 103 forming an overflow opening 107, an annular or tubular element 105 arranged within the oil filling collar 103 being displaceable along the longitudinal axis of the oil filling collar 103 and/or radially rotatable, opening or closing a lateral opening 109 in the oil filling collar.

To fill oil into the oil pan, the following procedure is adopted: The annular or tubular element 105 is positioned so that it closes the lateral breach 109 in the oil filling collar 103. When the oil pan has been fitted in position in the motor vehicle, oil can be filled via a hose, for example, which is inserted through the opening in the base of the oil pan and through the cavity of the oil filling collar 103 into the interior 104 of the oil pan. When the oil level reaches the overflow opening 107, the maximum oil level is reached. The oil level is determined by the length of the oil filling collar 103. Once the oil has reached its defined level 108, the hose is withdrawn from the oil pan and the oil drain screw 110 is screwed into the opening 101 in the oil pan base 102, thus closing the oil pan.

If the oil is to be drained from the oil pan, the oil drain screw 110 is unscrewed from the opening in the oil pan base. In this case, only that oil flows out that entered the cavity of the oil filling collar 103 due to the motion of the motor vehicle or the oil pan. To drain the rest of the oil from the oil pan the annular or tubular element 105 is displaced with a tool so that the opening in the oil filling collar covered by this element is opened. The annular or tubular element can be displaced along its longitudinal axis. In an alternative embodiment the annular or tubular element is rotated radially so that a breach in this annular or tubular element 105 and the breach 109 in the oil filling collar 103 become aligned. The oil can now flow out of the oil pan through this lateral breach 109 in the oil filling collar 103 and then out via the opening 101 in the oil pan base 102 so that it can be collected. When the oil has been drained from the oil pan, the oil pan can now be removed, with some oil possibly remaining in the oil pan, and servicing work can continue.

The object of the invention will be explained in greater detail with reference to the following figures:

FIG. 1 shows a section through the filling device for oil level regulation in its dismantled state. In the embodiment shown in FIG. 1, the oil filling collar 3 is designed with the oil pan base 2 in a single piece. The oil filling collar 3 and the filling pipe 5 have a catch 12 so that the filling tube 5, after it has been inserted into the oil filling collar 3, can be firmly positioned on the oil filling collar. Further, a threaded bushing 11 is provided which encloses the opening 1 in the oil pan base 2 and into which the oil drain screw 10 can be screwed with the use of a ring seal 13.

Figure 2:
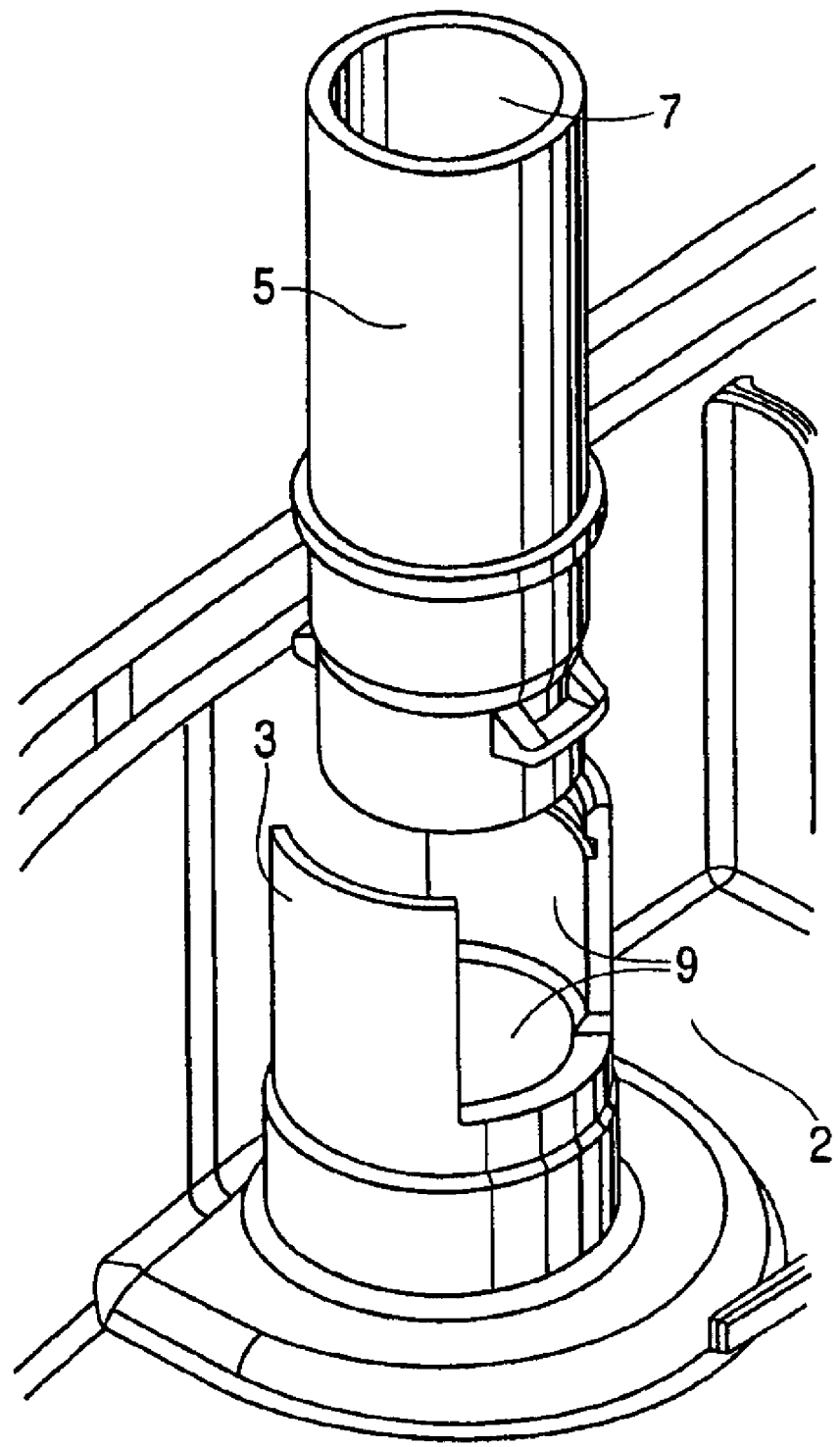
FIG. 2 shows a partially exploded oblique view of the filling device.

FIG. 2 shows a perspective view of the filling device, wherein the filling pipe 5 has not yet been inserted into the oil filling collar 3. In this illustration the breaches 9 in the oil filling collar 3 are visible through which the oil can flow out of the oil pan as soon as the filling pipe 5 is pushed up so far that this breach 9 is no longer covered and sealed by the wall of the filling pipe 5.

Figure 3:
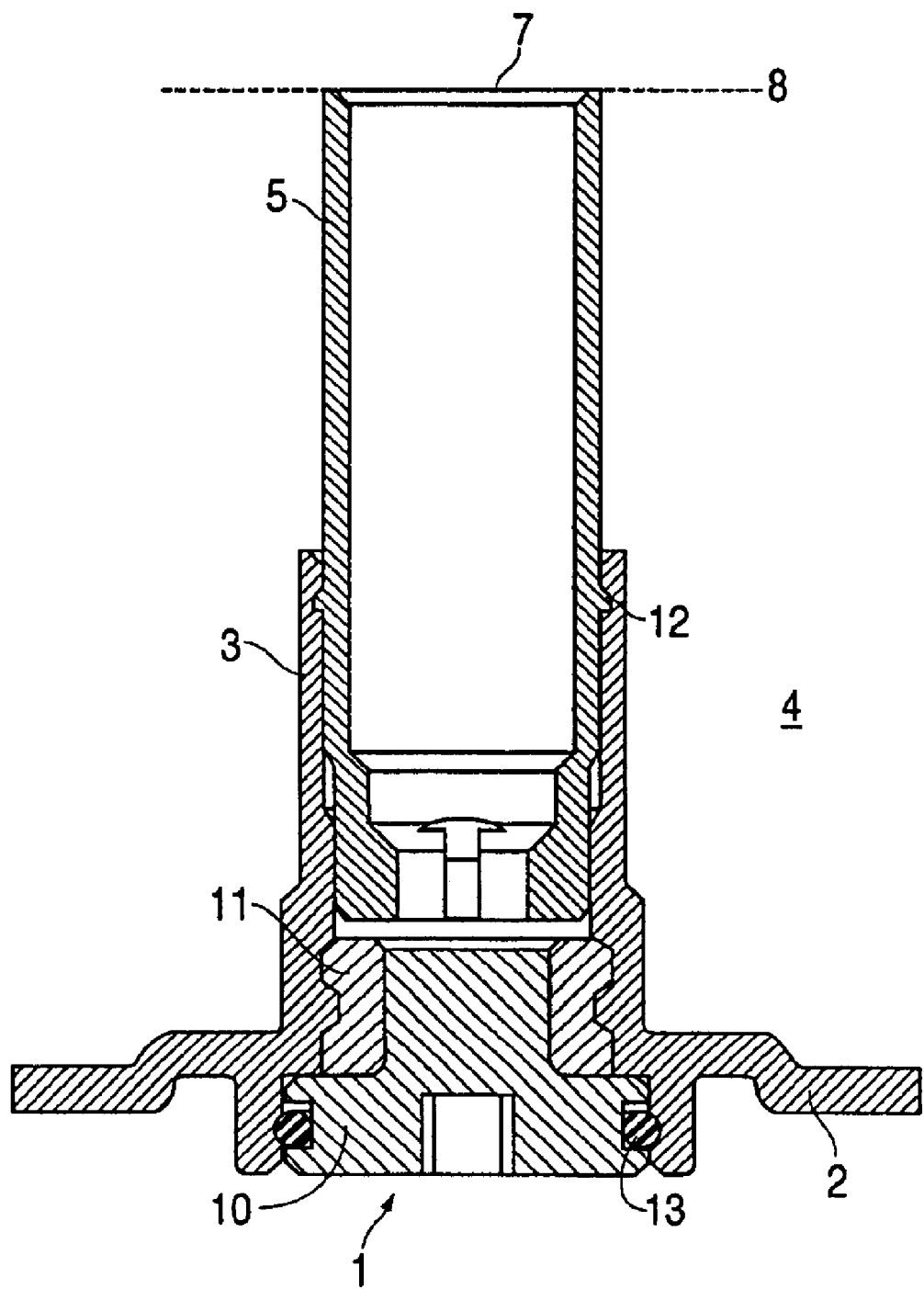
FIG. 3 shows a section view of the fully assembled filling device.

FIG. 3 shows the filling device in its assembled state, wherein the filling pipe 5 has been inserted into the oil filling collar 3 and engaged with catch 12. The oil drain screw 10 is also screwed into the threaded bushing 11 which encloses the opening 1. Number 13 designates the ring seal provided for the oil drain screw. Number 8 indicates the oil level.

Figure 4:
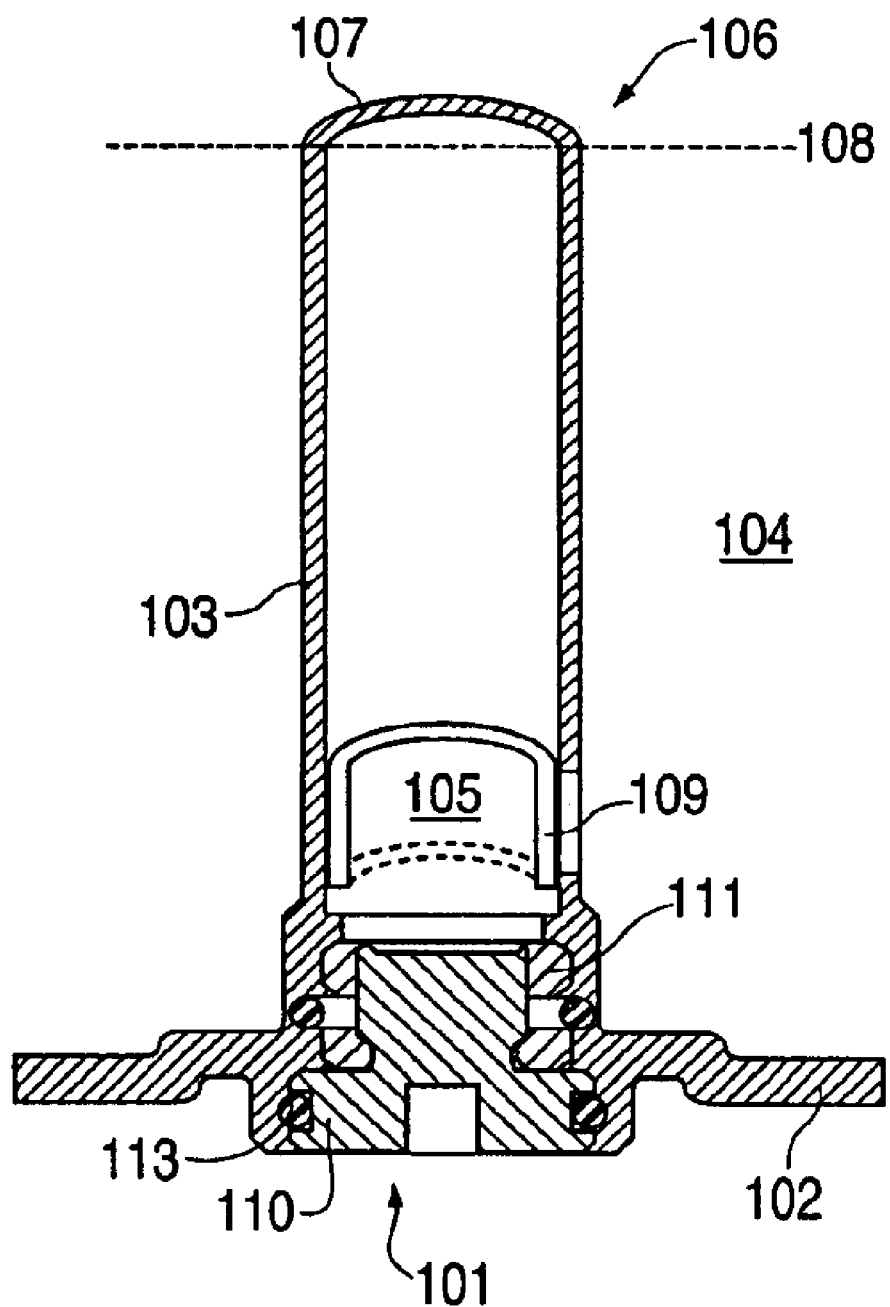
FIG. 4 shows a section view of a second embodiment of the filling device.

FIG. 4 shows a diagrammatic sectional view of another filling device, wherein an oil filling collar 103 is arranged over the opening 101 in the base of the oil pan 102. This opening 101 is closable with an oil drain screw 110. The oil filling collar 103 projects into the interior 104 of the oil pan. In this embodiment the free end 106 of the oil filling collar 103 serves as an overflow opening 107. An annular or tubular element 105 arranged within the oil filling collar 103 encloses a portion of the interior of the oil filling collar 103 and is displaceable along the longitudinal axis of the oil filling collar 103 or radially rotatable. The annular or tubular element 105 closes a lateral opening 109 in the oil filling collar. If the annular or tubular element 105 is displaced with a tool or radially rotated, the oil can flow out of the oil pan via this opening 109.

KEY TO THE DRAWING 1 opening
2 base of the oil pan
3 oil filling collar
4 interior
5 filling pipe
6 free end of the filling pipe
7 overflow opening
8 defined oil level
9 breach in the wall of the oil filling collar
10 oil drain screw
11 threaded bushing
12 catch
13 ring seal
101 opening
102 base of the oil pan
103 oil filling collar
104 interior
105 annular or tubular element
106 free end of the oil filling collar
107 overflow opening
108 defined oil level
109 lateral opening in the wall of the oil filling collar
110 oil drain screw
111 threaded bushing
113 ring seal

What is claimed is:

1. A filling device for oil level regulation of oil pans in engines and transmissions, comprising:
   an oil drain screw;
   an oil filling collar; and
   a filling pipe to fill an oil pan and regulate an oil level in the oil pan, the filling pipe having a top opening and a lateral opening, the top opening facilitating an overflow of oil having exceeded a predetermined level, the lateral opening facilitating drainage of oil from the oil pan, the filling pipe having a first engaged position and a second engaged position, the first engaged position substantially closing the lateral opening and the second engaged position opening the lateral opening to facilitate the drainage of oil from the oil pan, wherein in use, the drain screw closes off an opening in the oil pan, the oil filling collar is positioned over the opening in the oil pan, and the filling pipe is engaged with the oil filling collar to form an extension of the oil filling collar.

2. The filling device according to claim 1, wherein the filling pipe is releasably engaged to the oil filling collar.

3. The filling device according to claim 1, wherein the oil filling pipe and the oil filling collar are sealed in their engaged state.

4. The filling device according to claim 3, wherein the filling pipe and the oil filling collar are sealed in their engaged state in such a way that the oil in the oil pan can only flow outside the oil pan via the overflow opening.

5. The filling device according to claim 1, further comprising a breach in the oil filling collar, wherein the breach can be selectively opened to permit oil to flow out of the oil pan via the breach and through the opening in the oil pan, by disengaging the oil filling pipe.

6. The filling device according to claim 1, wherein the filling pipe is arranged within the oil filling collar.

7. The filling device according to claim 1, wherein the oil filling pipe is arranged outside the oil filling collar.

8. The filling device according to claim 1, wherein the oil filling pipe can be disengaged so that it detaches itself from the oil filing collar.

9. The filling device according to claim 1, wherein the filling pipe can be disengaged only within certain limits in relation to the oil filling collar and can also be fixed in the disengaged state.

10. The filling device according to claim 1, wherein the oil filling collar projects essentially vertically into the oil pan.

11. The filling device according to claim 1, further comprising:
    a threaded bushing enclosing the opening, wherein the oil drain screw engages the threaded bushing thereby closing the opening.

12. The filling device according to claim 1, wherein the oil filling collar is molded onto the oil pan.

13. The filling device according to claim 11, wherein the oil filling collar is arranged on the threaded bushing.

14. The filling device according to claim 13, wherein the oil filling collar and the threaded bushing are designed in a single piece.

15. An oil pan, comprising:
    an oil filling device according to claim 1.

16. A filling device for oil level regulation of oil pans in engines and transmissions, comprising:
    an oil drain screw;
    an oil filling collar, wherein the oil filling collar has a lateral opening; and
    a tubular element, the tubular element having a top opening and a lateral opening; the top opening facilitating an overflow of oil having exceeded a predetermined level, the lateral opening facilitating drainage of oil from the oil pan, wherein the tubular element is moveable within the oil filling collar between a first engaged position and a second engaged position to selectively open the lateral opening in the oil filling collar while in the first engaged position and substantially close the lateral opening while in the second engaged position, the first engaged position facilitating filling the oil pan, the second position facilitating draining the oil pan, and wherein in use, the drain screw closes off an opening in the oil pan, the oil filling collar is positioned over the opening in the oil pan.

17. A filling device according to claim 16 wherein the tubular element is displaceable along a longitudinal axis of the oil filling collar to selectively open the lateral opening of the oil filling collar.

18. A filling device for oil level regulation of oil pans in engines and transmissions, comprising:
    an oil drain screw;
    an oil filling collar, wherein the oil filling collar has a lateral opening; and
    a tubular element, wherein the tubular element is movable within the oil filling collar to selectively open the lateral opening in the oil filling collar, and wherein in use, the drain screw closes off an opening in the oil pan, the oil filling collar is positioned over the opening in the oil pan, and wherein the tubular element comprises a lateral breach and the tubular element is radially rotatable within the oil filling collar to selectively open the lateral opening of the oil filling collar.

19. A method of filling an oil pan with oil, comprising:
    connecting a conduit to an opening in an oil pan so that oil can flow from the conduit through the opening, wherein the oil pan is fitted with an oil filling collar over the opening and an oil filling pipe selectively engageable with the oil filling collar;
    allowing oil to flow into the opening until the oil filling pipe overflows;
    withdrawing the conduit from the opening; and
    plugging the opening with an oil drain screw.

20. A method of draining and filling an oil pan with oil, comprising:
    removing an oil drain screw from an opening in an oil pan;
    moving an oil filling pipe from a first engaged position to a second engaged position, the first engaged position facilitating filling the oil pan with oil and the second engaged position generating a gap between an oil filling collar and the oil filling pipe to allow oil to flow through the opening of the oil pan;
    connecting a conduit to an opening in an oil pan so that oil can flow from the conduit through the opening, wherein the oil pan is fitted with an oil filling collar over the opening and an oil filling pipe selectively engageable with the oil filling collar;
    allowing oil to flow into the opening until the oil filling pipe overflows; and
    withdrawing the conduit from the opening.

21. A method of draining and filling an oil pan with oil, comprising:
    removing an oil drain screw from an opening in an oil pan;
    moving an oil filling pipe within an oil filling collar from a first engaged position to a second engaged position, the first engaged position facilitating filling the oil pan with oil and the second engaged position generating a gap between the oil filling collar and the oil filling pipe so an opening in the oil filling collar is opened allowing oil to flow through the opening of the oil filling collar and out of the opening of the oil pan;

connecting a conduit to an opening in an oil pan so that oil can flow from the conduit through the opening; wherein the oil pan is fitted with an oil filling collar over the opening and an oil filling pipe selectively engageable with the oil filling collar;

allowing oil to flow into the opening until the oil filling pipe overflows; and withdrawing the conduit from the opening.

22. A filling device for oil level regulation of oil pans in engines and transmissions, comprising:

means for connecting a conduit to an opening in the base of an oil pan so that oil can flow from the conduit through the opening, wherein the oil pan is fitted with an oil filling collar over the opening and an oil filling pipe selectively engageable with the oil filling collar the filling pipe having a top opening and a lateral opening, the top opening facilitating an overflow of oil having exceeded a predetermined level, the lateral opening facilitating drainage of oil from the oil pan;

means for allowing oil to flow into the opening until the oil filling pipe overflows;

means for withdrawing the conduit from the opening; and means for closing the opening.

* * * * *